United States Patent [19]
Wese

[11] Patent Number: 5,207,923
[45] Date of Patent: May 4, 1993

[54] PROCESS AND APPARATUS FOR WASTE WATER TREATMENT

[76] Inventor: John Wese, c/o A-1 Radiator Service, Inc., 6004 E. Virginia Beach Blvd., Norfolk, Va. 23502

[21] Appl. No.: 868,237

[22] Filed: Apr. 14, 1992

Related U.S. Application Data

[62] Division of Ser. No. 686,614, Apr. 17, 1991.

[51] Int. Cl.[5] ............................ C02F 1/56; C02F 1/62
[52] U.S. Cl. .................................. 210/727; 210/734; 210/912; 134/10; 134/13
[58] Field of Search ............... 210/726, 727, 733, 734, 210/738, 770, 724, 912; 134/10, 13; 165/909, 95, 5

[56] References Cited

U.S. PATENT DOCUMENTS

| | | | |
|---|---|---|---|
| 3,171,804 | 3/1965 | Rice | 210/727 |
| 3,506,570 | 4/1970 | Wukasch | 210/727 |
| 4,173,532 | 11/1979 | Keoteklian | 210/727 |
| 4,417,976 | 11/1983 | Sander et al. | 210/728 |
| 4,710,304 | 12/1987 | Lang | 210/738 |
| 4,714,558 | 12/1987 | Barbee et al. | 210/776 |
| 4,724,085 | 2/1988 | Pohoreski | 210/738 |
| 4,758,353 | 7/1988 | Spence et al. | 210/734 |
| 4,882,069 | 11/1989 | Pohoreski | 210/713 |

Primary Examiner—Stanley S. Silverman
Assistant Examiner—Neil M. McCarthy
Attorney, Agent, or Firm—John K. Donaghy

[57] ABSTRACT

The present invention relates to method and apparatus for treating waste water, particularly metal-containing waste water. The process includes separating and removing metals and other impurities from the waste water by the sequential addition of a base, a polyelectrolyte and an acrylamide-containing copolymer dispersion. The purified water is recycled for continuous reuse while the small quantities of metal-rich residue are available for reclamation.

13 Claims, 1 Drawing Sheet

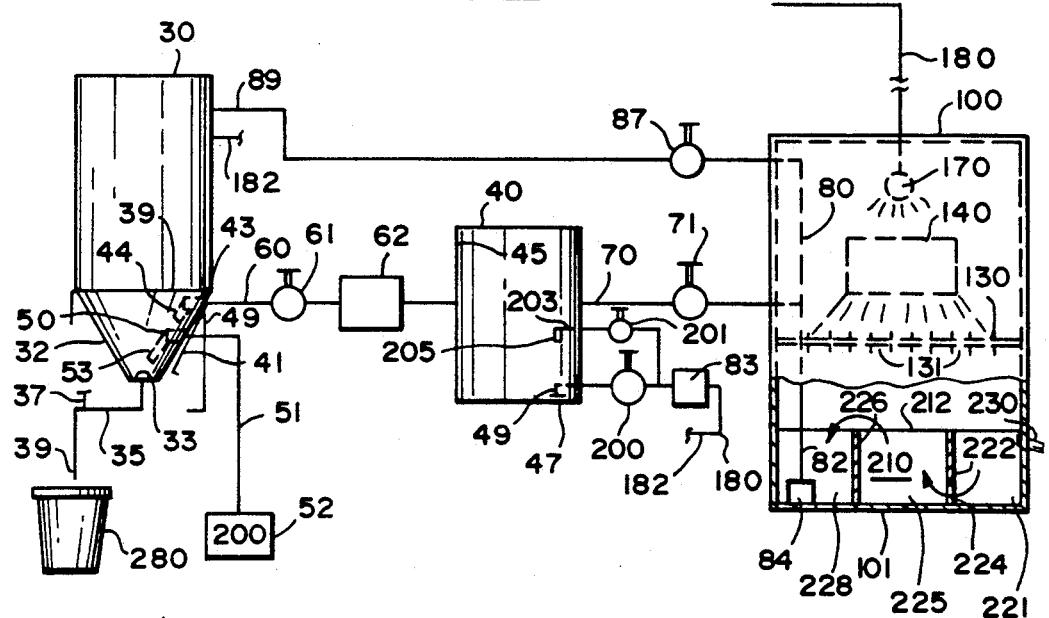
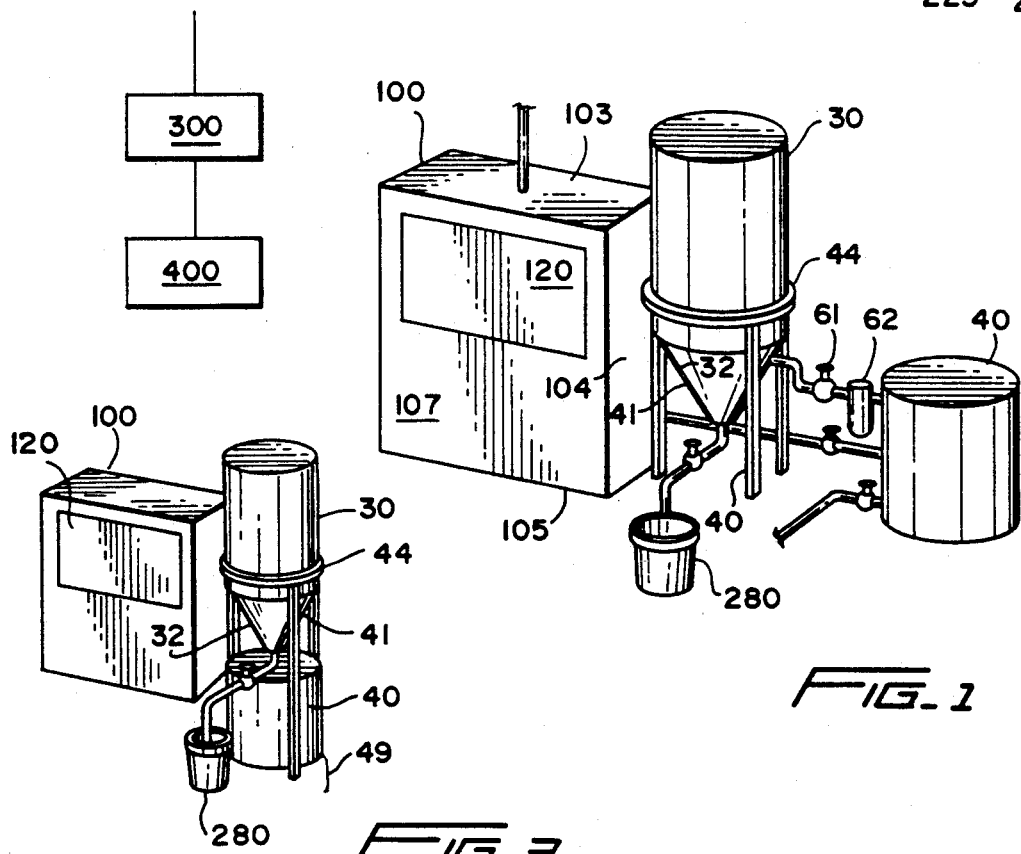

PROCESS AND APPARATUS FOR WASTE WATER TREATMENT

This is a division of application Ser. No. 686,614, filed Apr. 17, 1991.

FIELD OF THE INVENTION

This invention pertains to a process and apparatus for treating waste water and particularly waste water generated by the cleaning and repairing of automobile radiators.

BACKGROUND OF THE INVENTION

Hazardous and Solid Waste Regulations have greatly reduced the amount of wastes a small business can generate. The federal regulatory bodies governing the management of hazardous waste define hazardous waste as any solid waste which has the potential to harm human life or the environment. Under the passage of the Resource Conservation and Recovery Act of 1976, Small Quantity Generators, defined as those generating less than 1,000 kg per month of hazardous waste were provided an exemption from many of the requirements, but did have to go through the waste determination step and did have to dispose of their waste in an approved manner and/or at an approved site, including licensed municipal solid waste disposal facilities. The Hazardous and Solid Waste Amendments of 1984 have significantly changed this system by defining the SQG as one generating 100 kg (approximately 220 lbs or 27.5 gallons) per month. These changes have resulted in greatly increasing the number of regulated generators and the number of regulated wastes as well as increasing the pressure on local bodies to ensure that hazardous waste is not being introduced into the municipal waste stream.

Among the many Small Quantity Generators effected by these regulations are automobile service centers, such as gasoline service stations and radiator repair shops. Numerous contaminants are generated by these servicers in every day operations, such as the cleaning and repairing of engine parts. Included among these contaminants are solvents, road grime, used oil, organic compositions, such as antifreeze, and a wide variety of metals including significant quantities of copper, zinc and lead. In the past, such wastes have been disposed in municipal sewage systems, septic tanks and underground storage tanks. Each of these methods is costly in that special disposal is necessary and that such systems have high water requirements. The present invention is designed to treat all of these residues in a simple and efficient process.

It is expected that as concerns over the environment mount, and the diminishing quality of our water and the depletion of our landfills continues, further regulations will be enacted to lessen the amount of solids and hazardous wastes dispersed to the environment. Although there exists a number of methods for treating waste waters, none of these processes have been directed for the use of small generators of waste to treat waste waters produced in their stations and shops.

DESCRIPTION OF THE PRIOR ART

The prior art discloses various methods and apparatus for the treatment of sewage and the dewatering of aqueous solutions. None of the prior art shows a process and apparatus for treating water used for cleaning radiators and other industrial equipment which contain metals and other impurities. Representative of the prior art is the following list of patents. Copies are attached herewith for the record.

U.S. Pat. Nos. 4,724,085 and 4,882,069 to Pohoreski provide a method for the clarification of sewage waste water by adding thereto (1) an inorganic coagulant which comprises an aluminum or iron salt, (2) an anionic acrylamide polymer polyelectrolyte and (3) a cationic amine or acrylamide polymer polyelectrolyte. The sewage is turbulently mixed, the particulate matter is allowed to settle as sludge and pure water is separated. The sludge may be recycled to the sewage or other impure water to be treated.

U.S. Pat. No. 4,417,976 to Sander et al describes a process for dewatering petroleum-containing sludges by a two-stage method using finely divided additives, such as ash, coal, sand or mixtures thereof and organic flocculants, such as water-soluble, macromolecular compounds obtained by polymerizing or copolymerizing acrylamide, acrylic acid and/or its salts or esters. The pre-dewatered sludge mixture is treated with an aqueous mixture of aluminum salts or trivalent iron salts and this mixture is substantially dewatered via pressure filtration.

U.S. Pat. No. 4,710,304 to Lang discloses a method for improving the utilization of polyelectrolytes in dewatering aqueous suspensions by aging a mixture of polyelectrolyte and water for a period of at least six hours to form an aged solution.

U.S. Pat. No. 4,173,532 to Keoteklian relates to a method for the removal of solid waste from a liquid effluent of an industrial plant utilizing coagulating and flocculating agents while simultaneously adjusting the pH of the treatment medium.

U.S. Pat. No. 3,506,570 to Wukasch describes a method for the clarification of and phosphate removal from sewage by the incorporation of a trivalent aluminum ion into the waste, followed by the application of a particular acrylamide-acrylic copolymer under flocculating conditions.

U.S. Pat. No. 3,171,804 to Rice relates to sewage and industrial waste purification by the use of a coagulating agent and a polyelectrolyte.

SUMMARY OF THE INVENTION

It is an object of the present invention to provide a method and apparatus for treating metal-containing waste waters.

It is another object of the present invention to provide a method and apparatus for the treatment of small amounts of metal-containing waste waters, such as those produced by a small quantity generator.

It is a still further object of the present invention to provide a method and apparatus for the treatment of waste waters produced by small quantity generators which is both safe and environmentally acceptable.

It is yet another object of the present invention to provide a method and apparatus for the treatment of waste waters produced by a small quantity generator which will be efficient and cost-effective.

It is a further object of the present invention to provide an apparatus for the treatment of waste water which is easily installed in any location.

It is another object of the present invention to provide a waste water treatment unit which is self-contained and which may be used by consumers in their homes or businesses.

It is also an object of the present invention to provide a method and apparatus for treating metal-containing waste waters wherein the resulting clean water may be recycled and the separated metals may be reclaimed.

BRIEF DESCRIPTION OF THE DRAWINGS

FIG. 1 is a perspective view of the apparatus of the present invention.

FIG. 2 is a schematic view of the apparatus wherein the process is carried out.

FIG. 3 is a perspective view of a stackable form of the apparatus.

DETAILED DESCRIPTION OF THE INVENTION

The present invention relates to a method and apparatus for treating waste waters, particularly metal-containing waste waters. Such waste waters include industrial wastes, particularly waste waters produced from small quantity generators, such as automobile servicers, gasoline service stations and radiator service shops.

Radiator service shops generally clean and repair radiators, water pumps, thermostats and other engine parts. Although the following description is directed to waste waters resulting from the cleaning and repairing of a radiator, it will be obvious to those skilled in the art that the process and apparatus of the present invention applies to the treatment of any metal-containing waste water.

The repair of a radiator comprises a series of preliminary cleaning steps designed to remove build-up, dirt, grease, grime et al. Initially, the radiator must be drained, thereby generating anti-freeze and metals from oxidation. After the radiator is drained, it is cleaned in order to remove build-up, grease, dirt and other contaminants. Following the cleaning step, the radiator is repaired or recored by metal soldering or welding. Each of the foregoing procedures generates a metal-containing waste. As will be discussed more fully below, the present invention is designed to treat all of these residues and sludges in a simple and efficient process which is both safe and environmentally acceptable.

FIG. 1 shows a treatment tank 30, a storage and rinse tank 40 and a work station 100, sometimes referred to as a flush housing. The housing 100 has side walls 101, back wall, top wall 103, bottom wall 105, front wall 107 and swinging door 120. The tanks 30 and 40 may be of any size depending on the capacity requirements of a particular processing plant.

FIG. 2 is a schematic of the system of tanks and work station having numerous interconnections therebetween. It is seen that tank 30 has a cone-shaped bottom 32 with an opening 33 connected by line 35 having a valve 37 thereon, and an open end 39 for the discharge of material from the tank 30 to a container positioned below, said container being more fully described hereinafter.

The tank 30 is supported on a frame 49 of suitable strength to support a full tank with water containing metal particles and other impurities and contaminants. The frame 49 has a plurality of diagonal members 41 upon which rest the wall of the cone 32. This provides optimum support for the cone 32 when the tank 30 has been filled with waste water which is to be treated.

The cone wall 32 has a first opening 50 therein and a line 51 extending away therefrom to an air pump (or compressor) 52 having suitable valves, regulators and switches as is customary with such machinery.

The opening 50 for a pump inlet line 51 is in the upper section of the cone and between the bottom opening 33 and the top 39 of the cone. An agitator nozzle 53 on the opening 50 extends toward the bottom opening 33. Further along the cone wall 32, near the top 39 is another opening 43 from which extends a line 60 having a valve 61 therein. A down-turned nozzle 44 connects to line 61 from the inside of the cone 32. The line 60 attaches to a filter 62 which in turn is attached to the storage tank 40 near the top 45. It will be seen that tank 40 is a closed tank and can be of any size necessary to meet the requirements of a particular shop. A line 70 having a valve 71 connects the tank 40 to a sump line 80 as shown.

The sump line 80 is connected at one end 82 to a sump pump 84 which rests on a sump separator tray 212 to be more fully described below. The other end of line 80 passes through a valve 87 to the top 89 of tank 30. The sump line 80 may be connected within the work station 100 by any suitable means. The work station 100 is a housing having a back wall, side walls, a top wall and a front wall which may be of any size to accommodate the equipment to be cleaned. Access to the interior of the housing may be by way of a swinging door. A perforated or slotted platform 130 is suitably positioned in the work station 100 for optimum work rest position. A radiator 140 or other piece of equipment for cleaning is shown resting on the platform 130. A spray-head 170 is secured by either stationary or moveable means within the housing 100 and is attached by a line 180 to pump 83 through a valve 200 to the tank 40 near the bottom 47. The line 180 near the bottom 47 enters the inside of the tank 40 and has a down-turned nozzle 49 having an opening in its end, which opening is near the bottom wall 47. A line 203 extends from line 180 through a valve 201 through the wall of tank 40 to the inside thereof as shown. A down-turned nozzle 205 is on the inside of the tank and connects to line 203.

The housing 100 has a sump area 210 having a separator tray 212 which receives water from the radiator cleaning step through the openings 131 of the platform 130. The waste water containing metals and other impurities collects in tray 212 which has a chamber 221 and a baffle 222 open at 224 for the passage of waste water. The waste water passes into chamber 225 and over baffle 226 into chamber 228. It will be seen that an equilibrium is reached once the water fills the chambers in tray 212. Once the equilibrium is reached, oils, metals and other debris may be skimmed off the top of the water in chamber 221 through outlet 230 by any known method. As cleaning of the equipment continues, the waste water continuously flows from the sump tray 212 by pump 84 to tank 30 through line 80. The waste water then passes by gravity pressure through opening 43 in cone 32 through line 60, valve 61 and filter 62 into tank 40 from where it is pumped by pump 83 through feed line 180 to the spray head 170. This recycling occurs when valves 87 and 61 are open and valves 71 and 200 are closed, and valve 201 is open to line 180. In operation, the tanks and work station are connected as shown. Tank 40 is filled with clean water from any source. Equipment, engine parts and the like, for instance, an automobile radiator, which requires cleaning, is placed on platform 130. Valves 61 and 87 are open. Valves 71 and 200 are closed and valve 201 is opened. Pump 83 is activated by, for example, a button near spray-head 170. Pump 84 is activated by an automatic switch which is opened when a predetermined amount of water is in tray 212. Water under pressure from pump 83 is sprayed from spray-head 170 onto the radiator 140 thereby resulting in the removal of metal particles and other impurities. The waste water flows into sump separator tray 212 and is recycled back to tank 30 by pump 84 through line 80 and open valves 87 and 61.

The water in the cone 32 and tank 40 is continuously recycled and used for shop work such as the cleaning of various equipment 140. After extended use, the water becomes too contaminated for either recycle or reuse. At this point, valves 61 and 201 are closed and valve 200 is opened whereby pump 83 fills tank 30 from tank 40 through a separate line (not shown) from the pump to the tank 30. Pump 84 is then manually opened to drain the tray 212 into the tank 30 at which time valve 87 is closed. Once the tank 30 is full and pump 52 is started, the contaminated water in the cone 32 is vigorously agitated. As more fully described hereinbelow, this contaminated rinse water is treated by the process of the present invention.

The sludge remaining in the treatment tank settles into the cone 32 and is removed through line 35 and into container 280. The sludge may be dried, or otherwise treated, by processes well-known in the prior art, in apparatus 300 and 400.

As discussed above, the metal-containing waste water treatment process is initiated when the radiator rinse water, generated in the rinsing step outlined above, has been recycled to the point that it is no longer suitable for recycle or reuse, typically once every week or less in the average servicing shop. Once the waste water has been transferred to the treatment tank 30, it is rapidly agitated in order to thoroughly mix it. Small amounts of the sludge from various other cleaning operations (fully discussed herebelow) also may be transferred to the treatment tank. The pH of the contents of the treatment tank 30 is determined, and, if necessary, adjusted to an acceptable level. After the desired pH has been achieved, the chemical treating agents are added sequentially. The resulting waste water and sludge in the treatment tank is vigorously agitated for a short period of time. Following agitation, the metals and other contaminants undergo flocculation. Normally, flocculation occurs in a relatively short time, for instance two to three hours. Following a settling time of at least two hours, and preferably overnight, clean water is removed and recycled to the holding tank.

The sludge remaining in the conical bottom 32 of the treatment tank 30 is collected and placed in a container 280. Once the residue has dried, the metals therein may be reclaimed; for instance, the dry sludge may be sent/shipped to a metals reclaimer.

In addition to treating the rinse water from tank 40, other hazardous wastes resulting from comparable shop operations may be simultaneously treated. Once the radiator has been drained in the work station 100, it may be desirable to soak it in a boilout tank (not shown) in order to soften oxidation build-up, dirt, grease, road grime and paint thereby facilitating the cleaning of the radiator. The residue generated from the boilout tank normally contains a number of metal contaminants including significant quantities of lead, tin, copper and zinc; this metal-contaminated waste water may be returned to the tank 40 or it may be transferred to a separate storage tank.

The foregoing method is becoming replaced by new methods. One such method is ultrasonic cleaning which works more efficiently than the boilout tank and generates less residue; however, the residue has higher concentrations of metals. In most situations, the radiator is first soaked in the boiling tank and then undergoes ultrasonic cleaning. The resulting waste water contains the same metals as those generated in the boilout tank, although in higher concentrations. The contaminated waste water and sludge is treated as discussed above with respect to the boilout tank.

After the radiator has soaked in the boilout tank and/or has undergone ultrasonic cleaning, it is usually rinsed, for example, under a pressure washer such as that decribed above. The rinse water from the pressure washer drains into the sump area and is pumped to holding tank 30 and then to tank 40. This recycle continues until such a time that the water becomes so contaminated that it must be cleaned. Sludge settled at the bottom of the sump tank is subsequently removed for treatment.

A glass bead machine (not shown), which is essentially a cleaning gun, may also be used to further clean the radiator. Air and tiny glass beads are released from the gun, which operates somewhat like a small sand blaster. Some glass beads disintegrate and some are recycled. The disintegrated beads, together with the metal, dirt, and other contaminants removed from the radiator, are sucked into a dust collector (also not shown). The metal contaminants are the same as noted above.

Once the radiator has been cleaned, it is ready to be repaired Repair methods include lead soldering, silver soldering and aluminum welding. Repair methods are conducted at the work station. After the radiator is repaired, it is put into a test tank to determine whether there are any leaks or other problems which require further repair work. The test tank generates a residue which is high in solder (i.e. lead and tin) and zinc.

If the radiator is not repairable, the radiator may be recored. In recoring the solder must be melted out of the radiator seam, which produces a significant amount of solder drippings. The radiator is then taken apart so that the individual parts (e.g. the tank, straps, and connections) may be reused. These parts are cleaned either with a glass bead machine or manually with a wire brush or flux acid, again generating contaminants. Solder then is used to reassemble the cleaned parts onto a new core, resulting in still more solder drippings which drain into the sump area 210 as described above.

More specifically, the process of treating the metal-containing waste water comprises the following steps:
(a) transferring the contaminated rinse water to a treatment tank and thoroughly agitating;
(b) optionally adding other hazardous wastes to the treatment tank and measuring the pH;
(c) adding an aluminum base, such as aluminum sulfate, to the treatment tank, followed by agitation;
(d) adding an organic polyelectrolyte to the treatment tank, followed by agitation;
(e) adding an acrylamide copolymer dispersed in mineral oil, such as a copolymer of sodium acrylate and acrylamide to the treatment tank;
(f) agitating the treatment tank in order to thoroughly mix resulting mixture;
(g) allowing precipitates to settle;
(h) recycling the treated water to the holding tank or releasing the treating water to the sewer;
(i) filtering the remaining sludge and transferring it to a smaller container;
(j) drying or otherwise treating the sludge; and (k) collecting the dried product for transport to a metals reclaimer or for disposal.

The pH of the treatment tank containing the waste water and sludges most probably will be high, for example, between 10 and 12. However, if the servicing shop has no boilout tank or ultrasonic cleaner it may be necessary to raise the pH before adding the "AMUSON", base. Raising the pH of the waste water in the treatment tank can be accomplished by any number of means well known in the art, said means including the addition of soda ash or other alkali salt.

The aluminum-containing base is preferably an aluminum sulfate $(Al_2(SO_4)_3 - 14H_2O)$, referred to hereinafter as an "AMUSON" base. The "AMUSON" base is characterized by its ability to attach itself to the metal ions in the waste water. The base is added to the treatment tank, preferably by dissolving in water. The amount of base to be added to the treatment tank will be dependent upon the size of the treatment tank, the pH of the tank, as well as the various types of waste which have been added to the contaminated rinse water. For example, if sludge has been generated from the boilout tank, ultrasonic cleaner, sump tank, et. al., the pH will be fairly high, for instance, in the range of 11 to 12. On the other hand, if the only sludge and waste water to be treated are generated from the sump and test tanks, the pH might be significantly lower.

Once the starting pH is determined, the "AMUSON" base is added to the treatment tank. Preferably, the "AMUSON" base first is dissolved in water thereby facillitating reaction with the metals contaminants in the treatment tank. Once the base has been added to the tank, the waste water is thoroughly agitated in order to allow the base to attach to the metal ions. After a period of from about five seconds to about thirty seconds, preferably from about fifteen seconds to about twenty five seconds, and most preferably about ten (10) seconds, the pH is again measured. For the process to proceed, the pH must be between from about 6 to about 9, preferably from about 7 to about 8 and most preferably, the ph should be about 7.5. If the pH is not within the desirable range, more "AMUSON" base may added in order to bring the pH to the desired level.

Organic polyelectrolytes are well known in the prior art and include acrylamides, acrylic acids, acrylic esters and derivatives thereof. The organic polyelectrolyte, hereinafter referred to as "AMUSON" 03, must be of such a nature that it is capable of attaching to the base and also to other materials that are in the water, such as foreign debris, dirt and grime. The amount of "AMUSON 03" employed is determined by the amount of the "AMUSON" base previously added to the treatment tank. It is noted that as the "AMUSON 03" is measured in ounces, one ounce of "AMUSON 03" would equal one cup of "AMUSON" base. Preferably, the "AMUSON 03" is dissolved in water before being added to the treatment tank. The acrylamide-based copolymer is preferably a copolymer of sodium acrylate and acrylamide dispersed in water, hereinafter referred to as "AMUSON 12". The "AMUSON 12" is capable of attaching to the "AMUSON" base and the "AMUSON 03" and the other above-noted contaminants in the treatment tank. The amount of "AMUSON 12" (also measured in ounces) which is to be added to the treatment tank should be from about 20% to about 45% of the amount of "AMUSON 03" added to the treatment tank, preferably from about 25% to about 40% of the amount of "AMUSON 03" added to the treatment tank, and most preferably, about 33% of the amount of "AMUSON 03" added to the treatment tank. The "AMUSON 12" is thoroughly premixed with water before being added to the treatment tank.

Once the three treating agents have been added to the treatment tank, the resulting treated waste water is thoroughly agitated for a period of from about 20 seconds to about one minute, preferably from about twenty seconds to about forty five seconds, and most preferably about thirty seconds. Following agitation, the flocculants or precipitates in the treatment tank are allowed to settle, preferably from about one hour to overnight. Following the settling step, the clean water is discharged. The clean water may be drained to the holding tank for reuse as rinse water, or it simply may be discharged into the municipal sewage system.

The residue and sludge remaining in the conical bottom of the treatment tank are collected, for instance by draining into a filter device, such as a filter-lined basket or similar container. The residue and sludge is dried, preferably by spreading the waste on a steel tray. Once a dried product has been obtained, it is collected and stored in any known manner, such as a bucket, barrel, or like container. At this point, the Small Quantity Generator has several alternatives; the Small Quantity Generator may store the dry product until he has accumulated a predetermined amount (for instance, about 100 lbs), the dry product may be disposed of immediately, for example in a landfill, or the dry product may be shipped for metal reclamation.

The following examples are illustrative of the present invention. Example 1 describes a preliminary test utilizing the AMUSON base without the use of the polyelectrolyte and the acrylamide-based copolymer.

EXAMPLE 1

Four hundred gallons of waste water, obtained from the cleaning of radiators, were transferred to a 450 gallon treatment tank. Analysis of the waste water determined that the waste water comprised approximately 200 ppm each of lead, zinc and copper and that the pH was 10.5. The treatment tank was agitated for five minutes. Five cups of "AMUSON" base, previously mixed in five gallons of water, were added to the treatment tank. The treated waste water was allowed to settle for four hours. Uncontaminated water (i.e. less than 1 ppm) was drained from the treatment tank. The remaining precipitates were filtered from the tank and dried. Analysis of this procedure determined that the resulting hazardous flock was very dust-like in texture and quite capable of reactivating in the clean water. The four hour waiting period was found to be too slow and costly.

EXAMPLE 2

Four hundred gallons of waste water having the same compositions and pH as above was transferred to the treatment tank. The waste water was agitated for five minutes. Five ounces of AMUSON base, previously mixed in five gallons of water, was added to the treatment tank. Five ounces of "AMUSON 03", previously mixed in water, was added to the treatment tank, followed by the addition of 1.67 ounces of "AMUSON 12" (also premixed in water).

The treated waste water was agitated approximately three minutes. Following agitation, the precipitates were allowed to settle for thirty minutes. Clean water (i.e. less than 1 ppm of each contaminant) was removed from the treatment tank, the remaining sludge was filtered and dried. Analysis of this procedure indicated that the addition of "AMUSON 03" and "AMUSON 12" resulted in the enlargement of the size of the flock, from that of a dust-like texture (in Example 1) to large dirt clogs having an average diameter of one-and-one-half (1.5) inches.

EXAMPLE 3

The radiator was placed in the boilout tank. The tank, containing water and an alkali mixture was heated to a temperature of about 200° C. The radiator was soaked for about one hour. A sludge was generated contaminated with lead, copper and zinc, as well as minor amounts of several other metals.

The radiator was transferred to an ultrasonic cleaner having transducers situated in the bottom of the tank. In operation, the transducers emit sound wave bubbles which implode upon contact with the radiator. The process cleaned the radiator down to the metal thereby generating a concentrated sludge.

Upon removal of the radiator from the ultrasonic cleaner, the radiator was rinsed in a pressure washer. Water was released from a 350 gallon holding tank. The flush and rinse water drained into a sump; the sludge accumulated in the sump area while a sump pump transported the water back to the holding tank for further use.

The cleaned radiator was then transferred to the work station for repairing. The radiator was sealed by lead soldering. Solder drippings accumulated in the sump area. The radiator was placed in the test tank to determine whether there were any leaks. Sludge resulting from the repair work was collected in the sump separator.

Contaminated rinse water from the holding tank was transferred to a 400 gallon treatment tank having a conical bottom mounted in a steel frame. To the waste water was added 1 gallon of boilout sludge, 1 gallon of ultrasonic cleaner sludge, 1 gallon of test tank sludge and 1 gallon of sump sludge, along with 1 gallon of spent coolant and 2 cups of glass bead dust. An analysis of the waste water determined that it was contaminated with the following metals: 52008.22 mg/l lead, 2622.20 mg/l copper, and 941.07 mg/l zinc, as well as minor amounts of several other metals. The waste water was agitated for five minutes in the treatment tank.

The pH of the treatment tank was determined to be 14. Eight cups of "AMUSON" base were mixed with four gallons of water and added to the treatment tank. The tank was agitated for one minute and the pH was again measured. The pH was determined to be 7. Eight ounces of "AMUSON 03" were mixed with four gallons of water and added to the treatment tank. The tank was agitated for one minute. Three ounces of "AMUSON 12" were mixed with four gallons of water and added to the treatment tank, followed by two minutes of agitation. The precipitates were allowed to settle for approximately two hours.

The treated water was removed from the tank and analysis determined that the water contained 2.2 mg/l copper, 8.22 mg/l lead, and 1.07 mg/l zinc. This clean water was recycled to the holding tank. The sludge remaining in the conical bottom of the tank was draine into a filter device. The sludge residue was then filtered and collected in a small, five-gallon bucket, spread onto a steel tray and dried. The sludge residue was left to dry overnight. Two and one-half gallons of dry product was collected.

In a variation of the present invention, the process and apparatus for treating waste water can be packaged in kit form. The kit package comprises chemical treating agents and storage means therefor; means for holding contaminated water, for example, a container or tank; means for combining said chemicals in the container, tank or other means of holding said contaminated water; and means for disposal of said contaminants, for instance, a small container. In a preferred embodiment of the variation of the present invention, the kit comprises (1) from about 100 to about 300 lbs of aluminum sulfate base, (2) from about 2 to about 10 quarts of an organic polyelectrolyte, and (3) from about one-half to about 4 quarts of a copolymer of sodium acrylate and acrylamide dispersed in mineral oil.

It is apparent that the sequential addition of the aluminum containing "AMUSON" base, the polyelectrolyte "AMUSON 03" and the acrylamide-based copolymer "AMUSON 12", coupled with vigorous agitation, results in the precipitation of large particles. These large particles, being heavier than the untreated contaminants, quickly settle to the conical bottom of the treatment tank, thereby affording the efficient separation of clean water from the treatment tank. The conical bottom of the treatment tank provides for the formation of a tight flock and also is very easy to clean.

While particular embodiments of the invention have been described, it will be understood, of course, that the invention is not limited thereto, and that many obvious modifications and variations thereof can be made, and that such modifications and variations are intended to fall within the scope of the appended claims.

I claim:

1. A process for treating waste water generated from one or more operations involved in the cleaning/and or repairing of automotive parts, said waste water contaminated with one or more metals comprising:
    (a) agitating said waste water in a treatment tank;
    (b) adding thereto an aluminum-containing base and agitating the mixture;
    (c) adding to the resulting mixture an organic polyelectrolyte and agitating the mixture;
    (d) adding to the resulting mixture a copolymer of sodium acrylate and acrylamide dispersed in mineral oil and agitating the mixture;
    (e) allowing the mixture to settle to form a clean water phase and a sludge phase;
    (f) separating the clean water phase from the mixture; and
    (g) treating the remaining sludge phase.

2. The process according to claim 1 wherein the aluminum-containing base is aluminum sulfate.

3. A process of treating a metal-containing waste water generated from one or more operations involved in the cleaning/and or repairing of automotive parts comprising the following steps:
    (a) transferring said metal-containing waste water to a treatment tank and thoroughly agitating;
    (b) adjusting the pH from about 6 to about 11;
    (c) adding an aluminum-containing base to the treatment tank, followed by agitation;
    (d) adding an organic polyelectrolyte to the treatment tank, followed by agitation;
    (e) adding an acrylamide-based copolymer dispersed in mineral oil, to the treatment tank;

(f) agitating the waste water in the treatment tank in order to thoroughly mix it;
(g) allowing solids to settle to form a sludge phase;
(h) separating a purified water phase from the treatment tank; and,
(i) filtering and drying the reaming sludge phase.

4. The process according to claim 3 wherein the aluminum-containing base is aluminum sulfate.

5. The process according to claim 3 wherein the acrylamide-based copolymer is a copolymer of sodium acrylate and acrylamide dispersed in a mineral oil.

6. The process according to claim 3 wherein the pH of the waste water is adjusted from to about 7 to about 8.

7. The process according to claim 3 wherein the contaminated waste water is radiator service shop rinse water.

8. The process according to claim 4 wherein one or more hazardous wastes generated from a radiator service shop and selected from the group consisting of a boilout tank sludge, ultrasonic cleaner sludge, sump tank sludge, test tank sludge, glass bead machine dust and spent coolant, are added to the treatment tank immediately after the metal contaminated waste water is added to the treatment tank.

9. A process for the treatment of metal-containing waste water and hazardous wastes generated from a radiator service shop comprising:
(a) agitating said waste water and hazardous wastes in a treatment tank;
(b) adjusting the pH of the waste water in the treatment tank from about 6 to about 11;
(c) adding thereto aluminum sulfate, previously dissolved in water, and agitating the resultant mixture;
(d) adding to the resulting mixture an organic polyelectrolyte, previously dissolved in water, and agitating the mixture;
(e) adding to the resulting mixture a copolymer of sodium acrylate and acrylamide dispersed in mineral oil and agitating the mixture;
(f) agitating the mixture in the treatment tank for a period of from about one hour to about three hours;
(g) allowing the mixture to settle for from about one hour to about overnight;
(h) separating a purified water phase from the mixture; and
(i) filtering and drying the sludge phase.

10. The process according to claim 9 wherein the pH of the waste water is adjusted from to about 7 to about 8.

11. The process according to claim 9 wherein the hazardous wastes are selected from the group consisting of boilout tank sludge, ultrasonic cleaner sludge, sump tank sludge, test tank sludge, glass bead machine dust and spent coolant.

12. The process according to claim 9 wherein the purified water is recycled to a rinsing tank.

13. The process according to claim 9 wherein metals in the dried sludge are reclaimed.

* * * * *